(12) United States Patent
Sheehan

(10) Patent No.: US 8,920,099 B2
(45) Date of Patent: Dec. 30, 2014

(54) LEVELLING SYSTEM

(75) Inventor: Patrick Sheehan, Bridgend (GB)

(73) Assignee: Catalyst Handling Research and Engineering Limited, Bridgend (GB)

( * ) Notice: Subject to any disclaimer, the term of this patent is extended or adjusted under 35 U.S.C. 154(b) by 368 days.

(21) Appl. No.: 12/990,462

(22) PCT Filed: Jun. 1, 2009

(86) PCT No.: PCT/GB2009/001378
§ 371 (c)(1),
(2), (4) Date: Feb. 14, 2011

(87) PCT Pub. No.: WO2009/144482
PCT Pub. Date: Dec. 3, 2009

(65) Prior Publication Data
US 2011/0135430 A1 Jun. 9, 2011

(30) Foreign Application Priority Data
May 30, 2008 (GB) .................................. 0809854.3

(51) Int. Cl.
*B65G 65/00* (2006.01)
*B01J 8/00* (2006.01)

(52) U.S. Cl.
CPC *B01J 8/003* (2013.01); *B01J 8/002* (2013.01); *B01J 2208/00752* (2013.01); *B01J 2208/00769* (2013.01); *B01J 2219/185* (2013.01)
USPC ............ 414/301; 414/288; 414/295; 141/286

(58) Field of Classification Search
USPC ................... 141/286; 414/301, 808, 288, 295
See application file for complete search history.

(56) References Cited

U.S. PATENT DOCUMENTS

| | | | | |
|---|---|---|---|---|
| 2,430,203 A * | 11/1947 | Bailey | ........................... | 414/323 |
| 2,747,500 A * | 5/1956 | Weatherly | ..................... | 100/217 |
| 3,123,234 A * | 3/1964 | Bjerkin | ........................ | 414/298 |
| 3,406,847 A * | 10/1968 | Sackett, Sr. | .................. | 414/295 |
| 3,468,438 A * | 9/1969 | Ladmirant | .................... | 414/298 |
| 3,487,508 A * | 1/1970 | Baumgartner et al. | ........ | 425/219 |
| 3,490,619 A * | 1/1970 | Dewittie | ........................ | 414/301 |
| 3,794,190 A * | 2/1974 | Lambert, Jr. | .................. | 414/295 |
| 4,306,829 A * | 12/1981 | Loutaty et al. | ................ | 414/301 |
| 5,758,699 A * | 6/1998 | Haquet et al. | ................. | 141/286 |
| 5,890,868 A * | 4/1999 | Comardo | ...................... | 414/587 |
| 5,950,694 A * | 9/1999 | Jama et al. | .................... | 141/286 |
| 6,729,365 B1* | 5/2004 | Cote et al. | ........................ | 141/69 |
| 7,531,024 B2* | 5/2009 | Buchelli et al. | ................. | 95/90 |
| 8,136,556 B2* | 3/2012 | Schroeder et al. | ............ | 141/79 |
| 2007/0266852 A1* | 11/2007 | Buchelli et al. | .................. | 95/90 |
| 2007/0297880 A1* | 12/2007 | Pinon et al. | ................... | 414/301 |
| 2010/0239399 A1* | 9/2010 | Hoogestraat et al. | ......... | 414/310 |

FOREIGN PATENT DOCUMENTS

| | | |
|---|---|---|
| JP | 5057177 | 3/1993 |
| WO | WO2004028679 | 4/2004 |
| WO | WO 2006013240 A1 * | 2/2006 |

* cited by examiner

*Primary Examiner* — Timothy L Maust
(74) *Attorney, Agent, or Firm* — Ice Miller LLP

(57) ABSTRACT

A particulate bed levelling arrangement has a rotational drive shaft and a particulate distribution arrangement coupled to the shaft. The particulate distribution arrangement engages with the particulate bed and moves to redistribute the particulate material in the bed in a direction radially outwardly away from the rotational drive shaft axis.

17 Claims, 6 Drawing Sheets

LEVELLING SYSTEM

PRIORITY

This application is a U.S. National Stage Application of pending International Patent Application PCT/GB2009/001378, titled "LEVELLING SYSTEM", filed 1 Jun. 2009, which claims priority of pending Great Britain Patent Application 0809854.3, titled "LEVELLING SYSTEM", filed 30 May 2008, each incorporated herein by reference.

The present invention relates to a levelling system and particularly to an industrial levelling system suitable for use in particulate handling environments such as vessel catalyst loading.

In the petrochemical industry it is necessary to load particulate catalyst into rector vessels. Such vessels can typically be large (for example 4 m diameter) and loading takes place by means of pouring the particulate material through a loading port or man way positioned at the top of the vessel. This results in one or more pouring peaks being created in the catalyst bed and it is necessary to level off the pre-loaded bed to eliminate (level) these peaks. Presently, operatives are typically lowered into the vessel in order to rake the bed to a more level condition. The environment in the interior of the vessel is harsh and this procedure is not advantageous from a health and safety perspective.

The invention has utility in respect of other situations in which a particulate bed requires levelling, particularly in the interior of a vessel.

An improved technique and apparatus have now been devised.

According to a first aspect, the present invention provides a particulate bed levelling arrangement comprising:
 a rotational drive shaft;
 a particulate distribution arrangement coupled to the shaft, the particulate distribution arrangement being arranged to distribute particulate material at the upper surface of the bed in a direction radially outwardly from the rotational drive shaft axis.

The technique is applicable to situations in which the bed is pre loaded and requires levelling subsequent to loading.

The particulate distribution arrangement beneficially operates by physically moving the material of the pre loaded bed in a raking or ploughing action.

In a preferred embodiment, the particulate distribution arrangement extends transversely outwardly from the rotational drive shaft.

Typically the arrangement is lowered into a vessel containing the particulate bed through a port in an upper portion of the vessel. Typically the port is a top port through which the particulate material is loaded into the vessel.

The drive shaft is preferably an elongate shaft extending from the particulate distribution arrangement which is positioned at a proximal end of the shaft (resting on the particulate bed in the interior of the vessel) to a distal end which is positioned externally of the vessel.

A drive arrangement is beneficially provided for the shaft. The drive arrangement is preferably provided proximate the distal end of the drive shaft, preferably to be operated from externally of the vessel. The drive arrangement preferably comprises a manual force drive arrangement, and may for example be operated by means of a turn handle or T bar.

A bearing arrangement is preferably provided for the drive shaft. The bearing arrangement preferably comprises one or more journal bearings to maintain the axial position of the rotating drive shaft, and also preferably a thrust bearing to take the weight of the drive shaft and particulate distribution arrangement assembly.

The bearing arrangement preferably comprises spaced first and second journal bearings, spaced in the axial direction of the shaft and beneficially disposed in the interior of the vessel.

It is preferred that a mounting arrangement arranged is capable of being secured to the vessel in order to support the drive shaft and particulate distribution arrangement assembly in position. In a preferred embodiment, the mounting arrangement is arranged to extend into the vessel through a port in the vessel.

It is preferred that the mounting arrangement includes means (such as a thrust bearing arrangement) for supporting the shaft to move rotationally. In one embodiment the mounting arrangement preferably includes a stationary bearing element arranged to cooperate with a rotational bearing element rotating with the drive shaft. In such an embodiment the rotational bearing element may comprises a roller or wheel arranged to roll about a thrust collar (or annulus) on the shaft comprising the stationary bearing element.

Beneficially, the arrangement includes adjustment means for adjusting the depth within the vessel at which the particulate distribution arrangement is positioned.

The shaft is preferably supportable by the mounting arrangement in a plurality of different positions for adjusting the depth within the vessel at which the particulate distribution arrangement is positioned.

In a preferred embodiment the particulate distribution arrangement comprises an elongate arm extending transversely (e.g radially outwardly from) to the axial direction of the drive shaft.

In one embodiment the particulate distribution arrangement may be pivotally connected to the drive shaft to be movable between an operational position extending transversely to the axis of the drive shaft, and a stowed position.

In a preferred embodiment, the particulate distribution arrangement physically redistributes pre-loaded particulate bed, preferably in a direction radially outwardly, and preferably in a raking or ploughing action. The particulate distribution arrangement, therefore, may beneficially comprise a plough or rake arrangement, which is beneficially connected to the drive shaft beneficially to extend radially outwardly from the drive shaft.

The arrangement may include levelling guide vanes shaped and positioned to distribute particulate material radially outwardly as drive shaft rotates.

According to a further aspect, the invention provides a method of levelling a particulate bed in a vessel, the method comprising:
 lowering into the vessel, via a port in the vessel, a particulate bed levelling arrangement;
 securing the apparatus to the vessel;
 operating the drive shaft from externally of the vessel to rotate the particulate distribution arrangement to distribute the surface particulate material in a direction radially outwardly with respect to the drive shaft;
 lowering the level at which the particulate distribution arrangement is positioned within the vessel to enabled continued operation of the drive shaft to rotate the particulate distribution arrangement to distribute the surface particulate material in a direction radially outwardly with respect to the drive shaft.

The invention will now be further described, by way of example only and with reference to the accompanying drawings in which.

Figure 1:
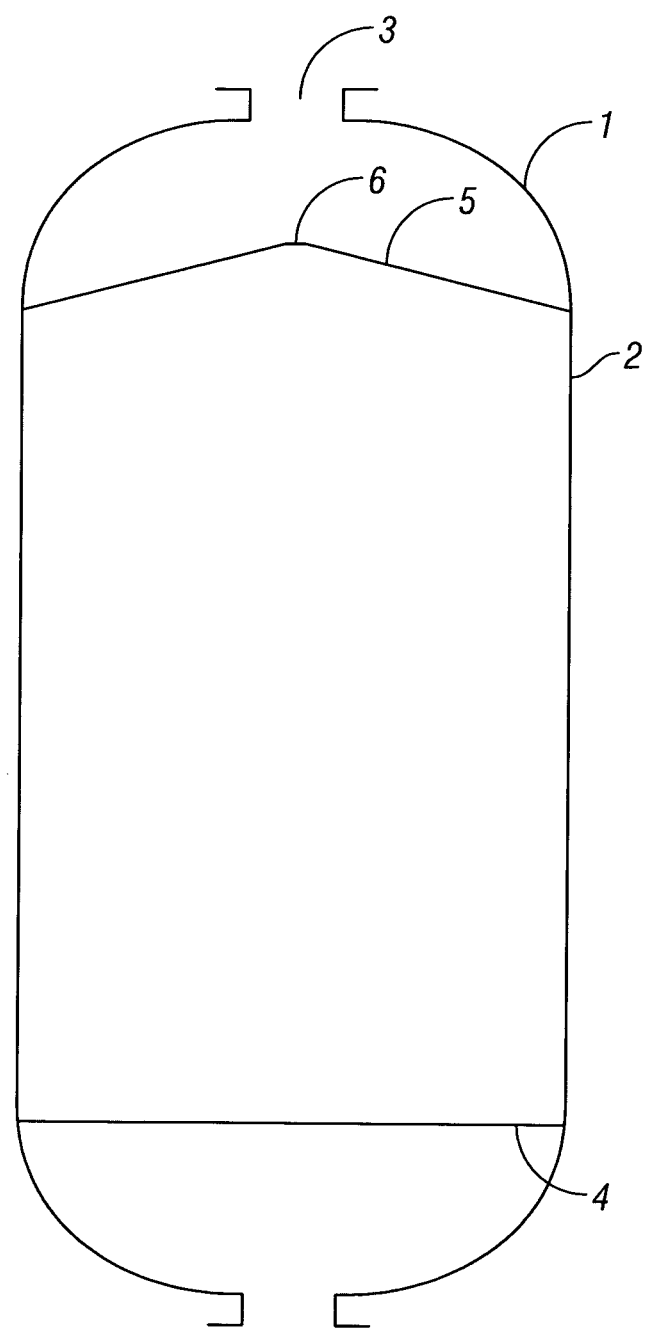
FIG. 1 is a schematic view of a reactor vessel having a catalyst bed.

Referring to the drawings, FIG. 1 shows a typical reactor vessel 1 within which a catalyst bed 2 is loaded via a top man-way port 3. The catalyst bed 2 is supported on a bed support grid 4. As a result of the top filling of the vessel by pouring in the particulate catalyst via the man-way port 3, a cone-form upper surface 5 is formed in the catalyst bed, having a peak 6 directly below the top man-way 3. For optimum performance the cone surface 5 of the particulate catalyst bed needs to be levelled and this as typically been achieved to date by manual operatives entering the vessel via the top man way 3 and levelling using a rake or other levelling arrangement.

Frequently the confined space internally of the vessel above the catalyst bed 2 can contain a non-life supporting atmosphere such as nitrogen, which is not beneficial from a health and safety view perspective and can result in operator fatality. It is a benefit of the of the invention to provide a system enabling levelling of the bed from externally of the reactor eliminating the need for personnel entry.

Figure 2:
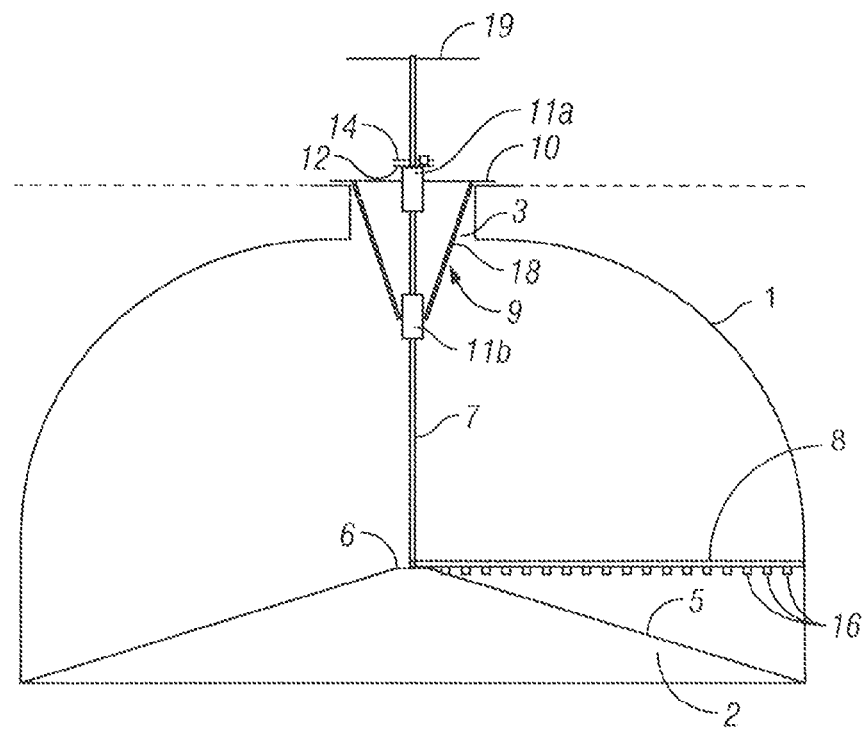
FIG. 2 is a schematic view of a particulate bed levelling arrangement in accordance with the present invention.

Referring now to FIGS. 2 onwards, the particulate bed levelling system comprises a rotational drive shaft 7 having, provided at its proximal end, a particulate bed levelling arm 8 extending perpendicularly to the axis of the rotational drive shaft 7. In a trialled embodiment the levelling arm 8 has been bolted to the proximal end of the drive shaft 7. However in an alternative embodiment it is envisaged that the levelling arm 8 could be pivotably secured to the rotational drive shaft 7, being pivotable between a stowed position (lying adjacently drive shaft 7) and an operational position extending transversely to the drive shaft, as shown in FIG. 2. This could aid in positioning and mounting the arrangement internally of the vessel 1.

A support and mounting arrangement 9 is provided comprising a support frame having a mounting flange 10 which is arranged to be secured (typically by clamping) to the uppermost flange of the man-way port 3. The support and mounting frame 9 includes a pair of spaced journal bearings 11a, 11b in use at least one of the bearings 11b is positioned by means of frame arms internally of the vessel in order to provide support for the drive shaft 7 as far down the shaft as possible. The bolting flange 10 has a central opening through which the shaft and bearing arrangement extends. This opening ensures that further particulate material can be poured into the vessel via the man-way port 3 if additional topping up material is required to be added to the catalyst bed 2 following levelling. The introduction of further particulate catalyst material into the vessel 1 can therefore be achieved with the bed levelling arrangement in position clamped to the man-way port 3.

A thrust collar 12 is provided for the mounting support 9 directly above the upper journal bearing 11a. The upper surface of the thrust collar 12 provides a stationary bearing element annulus against which a roller bearing element 13 secured to shaft 7 can roll. The roller bearing element 13 is provided on a height adjustment pin 14 Which locates through any one of a series of vertically spaced bolt holes provided through the shaft 7. The bolt hold are provided spaced apart vertically in order that the required bolt hole can be selected to ensure operation of the levelling arm 8 at the correct level within the vessel 1 dependent upon the level of the surface of the catalyst bed 2. As the peak 6 of the cone 5 of the particulate material 2 is lowered during operation of the bed levelling assembly, the shaft 7 can be lowered by removing the height adjustment pin 14 and replacing through the next sequentially arranged bolt hole in the drive shaft 7. The distal end of the shaft 7 is provided with a 'T' bar handle 19 in order to enable the bed levelling arrangement to be rotated manually about the axis of shaft 7.

Figure 3:
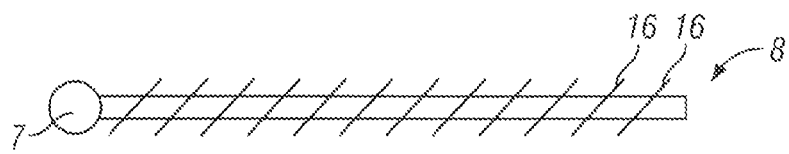
FIG. 3 is a schematic view of the particulate distribution arrangement (levelling arm) of the arrangement of FIG. 2.

Referring now to FIG. 3 the bed levelling arm 8 is shown in plan view connected to the shaft 7. The bed levelling arm engages with the material of the bed and acts as a rake or plough to re-distribute outwardly the pre-loaded particulate material of the bed. It should be noted that the bed levelling arm 8 carries a series of spaced guide vanes 16 along its length. These are angled with respect to the longitudinal axis of the arm 8 such that by rotation of the drive shaft 7 in the appropriate direction the guide 5 vanes 16 tend to distribute or feed particulate material generally radially outwardly in a direction away from the rotational axis of shaft 7 (i.e. in the general longitudinal direction of the arm 8 toward I the outer end).

Figure 4:
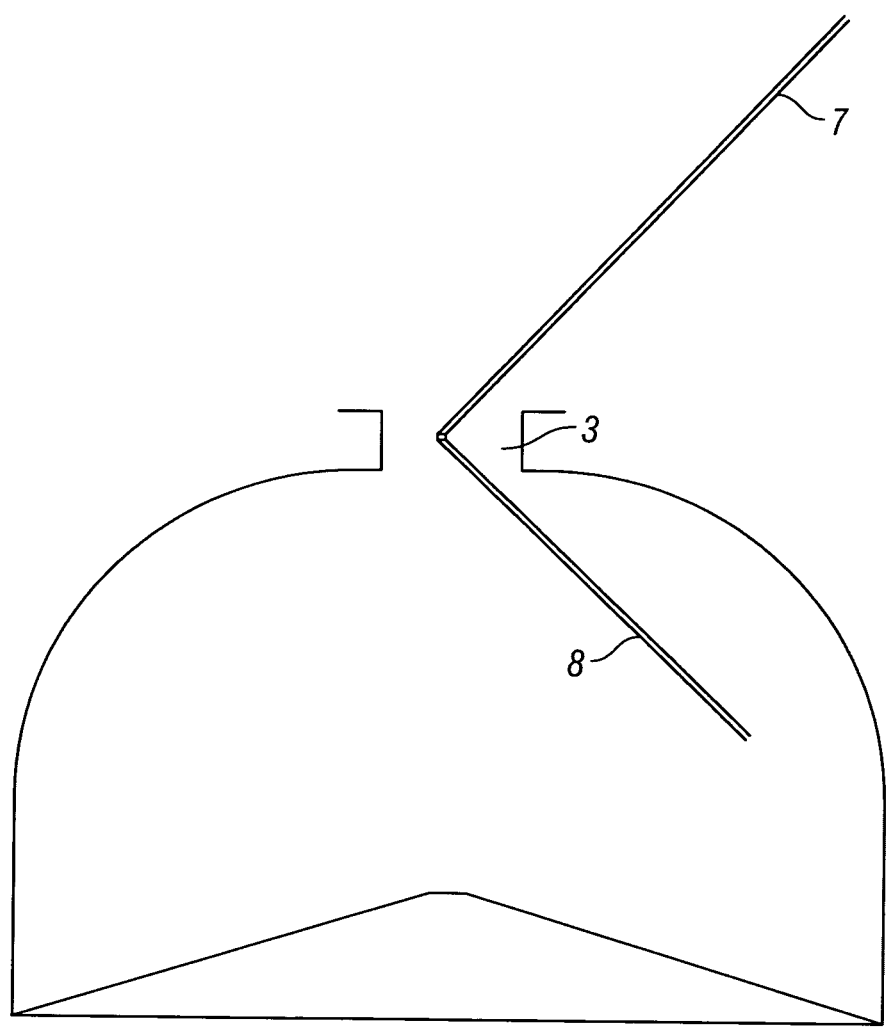
FIG. 4 is a schematic view showing an initial assembly stage of the particulate bed levelling arrangement of the invention.

Referring now to FIGS. 4 to 7, the assembly procedure for the particulate bed levelling arrangement is shown. Initially as shown in FIG. 4, the drive shaft 7 and bed levelling arm 8 are positioned internally of the vessel via the man-way port 3. Typically the shaft 7 and levelling arm 8 are formed of aluminium tubing and therefore extremely light and easily manipulatable. In a trialled embodiment this assembly has been manufactured having a levelling arm length of 7 ft and a drive shaft length of 10 ft, the entire assembly weighing less than 15 kg.

Figure 5:
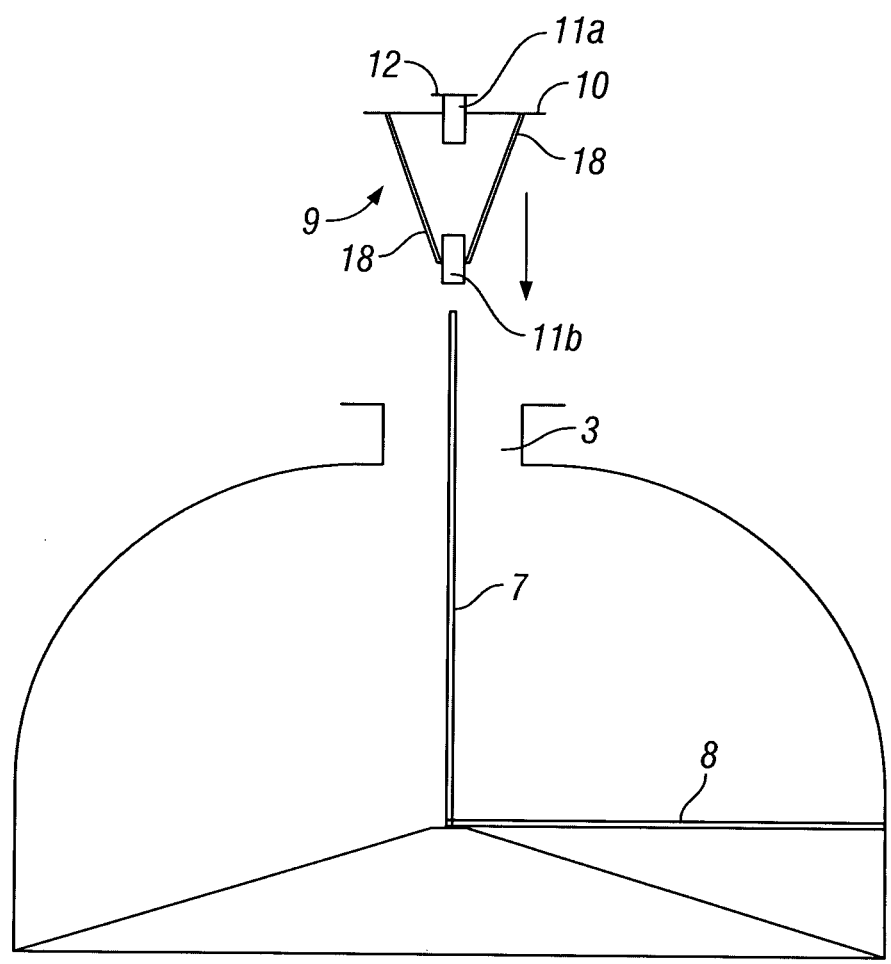
FIG. 5 shows a second stage of assembly of the particulate bed levelling arrangement.
Figure 6:
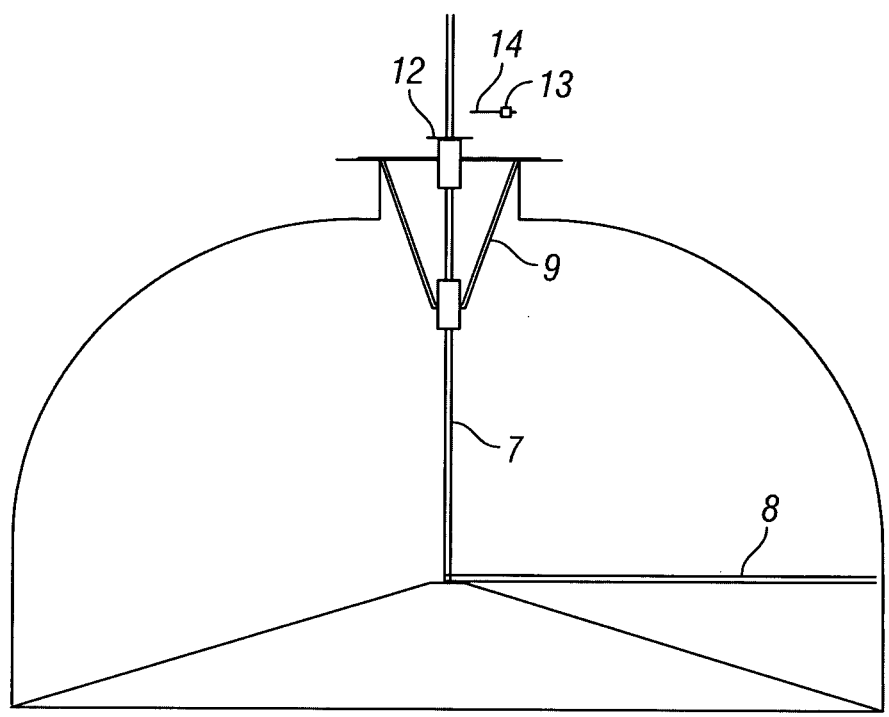
FIG. 6 shows a third stage of assembly of the particulate bed levelling arrangement.

Stage 2 of the assembly procedure is shown FIG. 5, in which the bearings 11a, 11b, carried on the mounting support frame 9 are lowered onto shaft 7. The mounting support frame 9 extends into the man-way port 3. In stage 3 of the assembly as shown in FIG. 6 the flange 10 of the mounting support frame 9 is bolted to the flange of the man way port 3 and the height adjustment in pin 14 is inserted through the relevant bolt hole in the shaft 7 to ensure that the roller bearing element 13 rolls on the stationary bearing annulus 12 of the support mounting frame 9.

Figure 7:
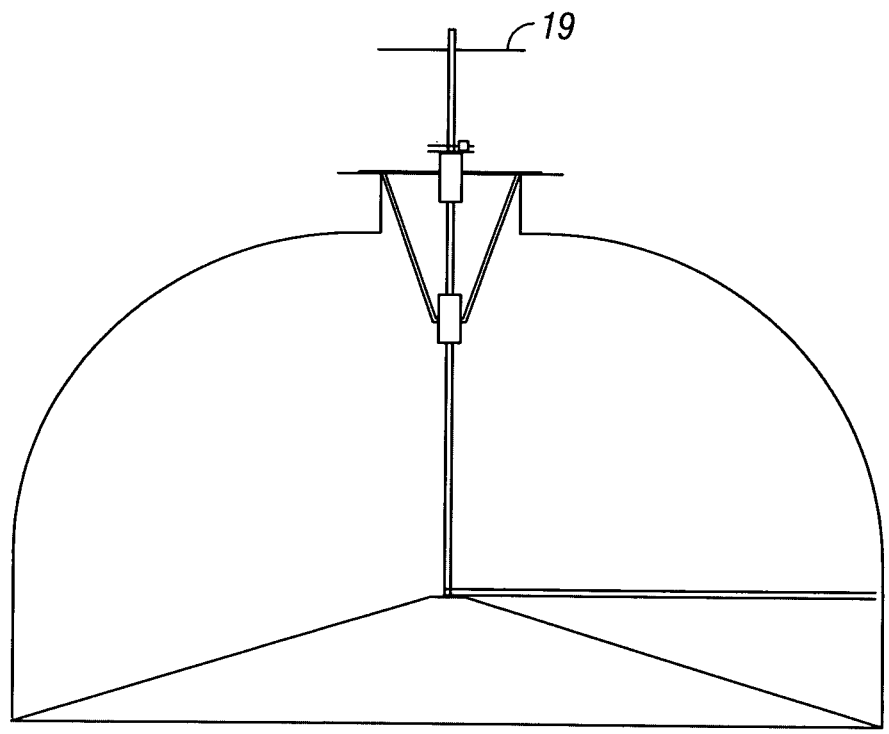
FIG. 7 shows the final stage of assembly.

Finally as shown in FIG. 7 the T-bar is inserted through the shaft 7 to enable manual rotation of the drive shaft 7.

Figure 8:
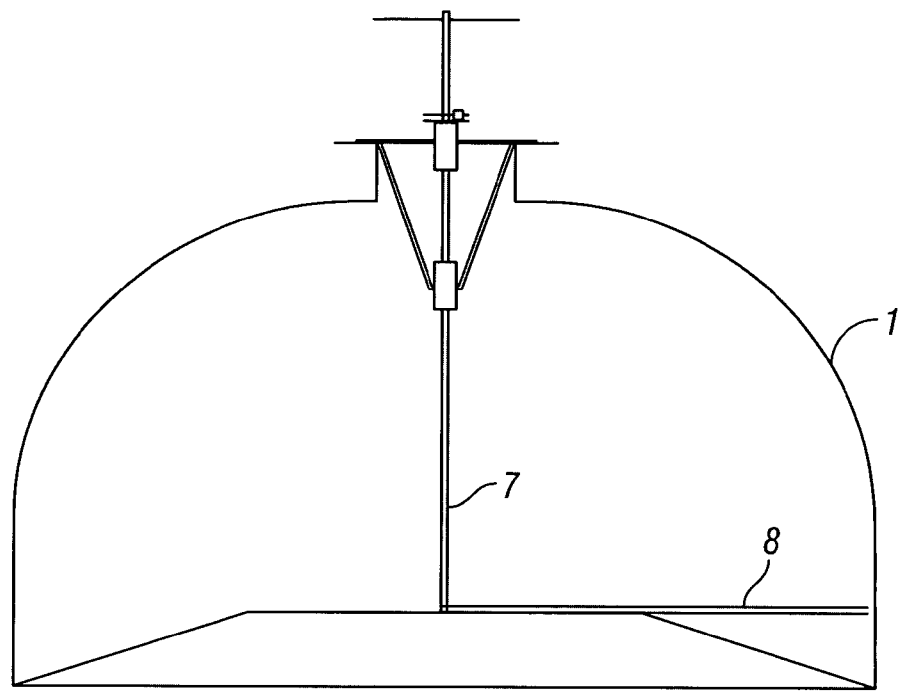
FIGS. 8 & 9 show sequential stages of operation in levelling a particulate bed using the particulate bed levelling arrangement.
Figure 9:
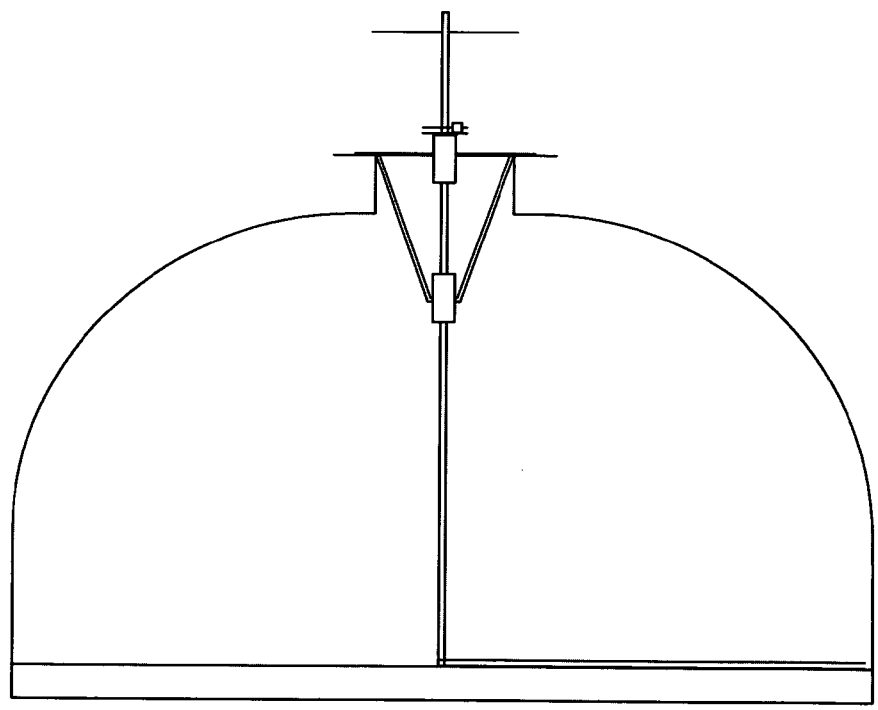

FIG. 8 shows how the levelling arrangement can be operated to level the peaked cone 6 of the catalyst bed. As can been seen between FIGS. 8 and 9 the shaft 7 is lowered as the cone reduces in size and the height adjustment pin 14 inserted via a different space bolt holes in the shaft 7, dependant upon the depth at which the levelling arm 8 needs to be positioned within the vessel.

The arrangement provides a simple, manually actuatable, lightweight system which can be rapidly deployed and used effectively in order to level a catalyst bed in a reactor vessel. Importantly the arrangement is actuatable manually from externally of the vessel and also enables the vessel to be topped up or additionally filled with catalyst material via the man-way port whilst the arrangement is secured in position in the relevant man-way port.

Whilst the invention has primarily been described in relation to use in catalyst handling applications in reactor vessels, it will be appreciated by the skilled addressee that the arrangement has value in other particulate handling situations.

The invention claimed is:

1. A method of distributing particulate material in a vessel preloaded with a particulate, the method comprising:
    inserting a rotational drive shaft into a vessel;
    positioning a leveling arm connected to the rotational drive shaft in contact with a particulate within the vessel;
    rotating the rotational drive shaft about an axis so that the leveling arm redistributes the particulate radially outward from the axis to lower a top of the particulate;
    lowering a depth of the drive shaft so that the leveling arm is in contact with the top of the particulate; and
    repeating the steps of rotating the rotational drive shaft about an axis so that the leveling arm redistributes the particulate radially outward from the axis to lower a top of the particulate and lowering a depth of the drive shaft so that the leveling arm is in contact with the top of the particulate until the top of the particulate is level.

2. The method of claim 1, wherein the leveling arm includes a rake and the step of rotating the rotational drive shaft about an axis so that the leveling arm redistributes the particulate radially outward from the axis to lower a top of the particulate further comprises redistributing the particulate with the rake.

3. The method of claim 2, wherein the rake comprises a series of leveling guide vanes spaced along a length of the leveling arm and the step of rotating the rotational drive shaft about an axis so that the leveling arm redistributes the particulate radially outward from the axis to lower a top of the particulate further comprises redistributing the particulate with the leveling guide vanes.

4. The method of claim 1, wherein the leveling arm is provided at a proximal end of the rotational drive shaft.

5. The method of claim 1, wherein a drive arrangement is coupled to the rotational drive shaft, the method further comprising actuating the drive arrangement to rotate the rotational drive shaft.

6. The method of claim 5, wherein the drive arrangement is located at a distal end of the drive shaft, the method further comprising actuating the drive arrangement externally from the vessel.

7. The method of claim 5, wherein the drive arrangement includes a manual force drive arrangement, the method further comprising manually actuating the manual force drive arrangement.

8. The method of claim 1, wherein the rotational drive shaft includes a bearing arrangement.

9. The method of claim 8, wherein the bearing arrangement includes spaced first and second journal bearings.

10. The method of claim 1, wherein a mounting arrangement is coupled to the rotational drive shaft, the method further comprising securing the mounting arrangement to the vessel.

11. The method of claim 10 further comprising extending the mounting arrangement into the vessel through a port in the vessel.

12. The method of claim 11, wherein the rotational drive shaft is coupled to the mounting arrangement through a bearing arrangement, the method further comprising supporting the rotational drive shaft internally within the vessel with the bearing arrangement.

13. The method of claim 12, wherein the mounting arrangement includes a stationary bearing element to cooperate with the rotational bearing element rotating the rotational drive shaft.

14. The method of claim 13, wherein the rotational bearing element includes at least one of a roller or wheel arranged to roll about a thrust collar that includes the stationary bearing element.

15. The method of claim 10 further comprising supporting the rotational drive shaft to move rotationally with the mounting arrangement.

16. The method of claim 1, wherein the leveling arm includes an elongate arm extending transversely to the axial direction of the rotational drive shaft.

17. The method of claim 1, wherein the leveling arm is pivotally connected to the rotational drive shaft, the method further comprising pivoting the leveling arm between an operational position and a storage position.

* * * * *